United States Patent [19]

Iida

[11] Patent Number: 5,872,524
[45] Date of Patent: Feb. 16, 1999

[54] AUTOMATIC ADDRESS ASSIGNMENT METHOD

[75] Inventor: Shuichi Iida, Tokyo, Japan

[73] Assignee: NEC Corporation, Japan

[21] Appl. No.: 645,571

[22] Filed: May 14, 1996

[30] Foreign Application Priority Data

May 15, 1995 [JP] Japan ................................. 7-115436

[51] Int. Cl.⁶ .................. G06F 9/00; H04J 3/04
[52] U.S. Cl. .................. 340/825.52; 340/825.08; 340/826; 340/827; 340/825.03; 370/254; 370/258; 370/440
[58] Field of Search .................. 340/825.52, 825.08, 340/826, 827, 825.03; 395/200.52, 200.58; 370/254, 258, 440

[56] References Cited

U.S. PATENT DOCUMENTS

| | | | |
|---|---|---|---|
| 4,730,251 | 3/1988 | Aakre et al. | 364/200 |
| 4,977,557 | 12/1990 | Phung et al. | 370/431 |
| 5,124,984 | 6/1992 | Engel | 370/230 |
| 5,353,283 | 10/1994 | Tsuchiya | 370/258 |
| 5,398,012 | 3/1995 | Derby et al. | 340/825.03 |
| 5,590,124 | 12/1996 | Robins | 370/258 |

FOREIGN PATENT DOCUMENTS

| | | |
|---|---|---|
| 63-93235 | 4/1988 | Japan . |
| 63-138831 | 6/1988 | Japan . |
| 5-167595 | 7/1993 | Japan . |

*Primary Examiner*—Michael Horabik
*Assistant Examiner*—Yonel Beaulieu
*Attorney, Agent, or Firm*—Ostrolenk, Faber, Gerb & Soffen, LLP

[57] ABSTRACT

The IP addresses of network elements are generated based on the ID numbers of nodes within a network having a predetermined configuration. After producing the configuration information including an interconnection relationship among the network elements, the respective IP addresses are determined such that the ID number of each node is used to determine an IP address of each network element according to the interconnection relationship between the node and the network element. A node IP address is determined based on the ID number of the node, and another IP address of each of the network elements other than the nodes is determined based on the sum of the total number of nodes and the ID number of the node.

20 Claims, 3 Drawing Sheets

AUTOMATIC ADDRESS ASSIGNMENT METHOD

BACKGROUND OF THE INVENTION

1. Field of the Invention

The present invention relates to an address generating method in a network, and in particular to a method of automatically generating node addresses and subnetwork addresses in a ring network.

2. Description of the Related Art

TCP/IP (transmission control protocol/internet protocol) is a suite of several networking protocols which is used for most UNIX implementations as well known. The TCP/IP protocol suite was developed as part of the ARPAnet project, which was a predecessor to many of the subnetworks as well as the Internet. Since an IP address consisting of a network address and a host (or node) address is a unique address assigned to a node or host on the Internet, the network address is assigned by the Internet Assigned Numbers Authority (IANA) in order to ensure the uniqueness in the world.

On the other hand, in a network to which a unique network address has been assigned, unique addresses within the network should be assigned to the nodes and the subnetworks forming the network, respectively. There have been proposed several conventional techniques relating to such address assignments as described hereinafter.

An automatic administration system for a loop network is disclosed in Japanese Patent Unexamined Publication No. 5-167595. A network administration station detects the state of a selected node and the respective MAC addresses of upstream and downstream nodes of the selected node starting from a predetermined node while sequentially selecting the nodes of the loop network until the MAC addresses and the states of all the nodes are obtained. Based on the relation of the MAC addresses and the states of all the nodes, the network administration station automatically generates a configuration information table containing the obtained data and updates the configuration information table when the network configuration is changed.

A bus adapter having an address conversion function is disclosed in Japanese Patent Unexamined Publication Nos. 63-93235 and 63-138831. Receiving a frame from a bus or ring network, the bus adapter automatically generates an address pair of node address and segment address based on the destination node address and the source node address included in the received frame. The address pair is registered into an address transform table whose size is variable according to the system arrangement. More specifically, the bus adapter is comprised of a ring interface permitting the connection of the ring network, a bus interface permitting the connection of the bus network, and a table memory storing one of n address transform tables having different sizes. When the address transform table in use has little available space, the address transform table in use is replaced with another size address transform table which is the smallest-size table among the larger-size tables than the in-use address transform table.

However, the above-mentioned conventional techniques are directed to address detection and address transform in order to cope with network system changes. There are neither description nor suggestion regarding an address assignment method for generating and assigning unique addresses to nodes and subnetworks. Although it is possible to manually assign the addresses to them in a small network, the larger size of a network results in the increased number of addresses to be assigned to the nodes and the subnetworks. Therefore, it is impossible in practice to manually assign unique addresses to them without error in a large-size network.

SUMMARY OF THE INVENTION

It is an object of the present invention to provide an address assignment method for automatically assigning unique addresses to network elements including nodes within a network.

It is another object of the present invention to provide a method for automatically assigning IP addresses to nodes and subnetworks included in a network.

According to the present invention, the unique addresses of the network elements are generated based on the predetermined unique numbers (or ID numbers) of the nodes. After producing configuration information of the network which includes an interconnection relationship among the network elements, the respective unique addresses of the network elements are determined such that the unique number of each node is used to determine a unique address of each network element according to the interconnection relationship between the node and the network element. More specifically, a unique address of each node of the nodes is determined based on the unique number of the node, and a unique address of each of the network elements other than the nodes is determined based on both a predetermined number and the unique number of the node.

In a network comprising a plurality of nodes and subnetworks wherein each of the subnetworks is located between two adjacent nodes and each of the nodes has a unique number, the configuration information of the nodes and subnetworks is produced which includes the interconnection relationship among the nodes and the subnetworks such that each subnetwork of the subnetworks connects between two adjacent nodes of the nodes in a predetermined direction. A unique address of each node of the nodes is determined based on the unique number of the node, and a unique address of each subnetwork of the subnetworks is determined based on both a predetermined number and the unique number of the node, the subnetwork being connected to the node according to the interconnection relationship.

In the case of the subnetworks comprising first subnetworks and second subnetworks arranged such that each of the first subnetworks connects between a first node and a second node adjacent to the first node in a first direction and each of the second subnetworks connects between the first and second nodes in a second direction opposite to the first direction, a unique address of each of the first subnetworks is determined based on a first set of the predetermined number, the unique number of the first node, and a first number associated with the first subnetworks, and a unique address of each of the second subnetworks is determined based on a second set of the predetermined number, the unique number of the first node, and a second number associated with the second subnetworks.

Typically, the network elements is arranged in a ring configuration and the unique address is an IP address comprising a first address and a second address, the first address being predetermined and the second address being determined according to a predetermined address generation rule. A node IP address is assigned to each of the nodes, and a subnetwork IP address is assigned to each of the subnetworks. The node IP address is determined such that the identification number of each node is assigned to a first octet of the second address of a node IP address and a predetermined number is assigned to a second octet of the second address of the node IP address. An subnetwork IP address of each subnetwork is determined based on both a predetermined number such as the total number of the nodes and the identification number of the node to which the subnetwork is connected according to the interconnection relationship.

In the case of the subnetworks comprising first subnetworks and second subnetworks arranged such that each of the first subnetworks connects between a first node and a second node adjacent to the first node in a first direction and each of the second subnetworks connects between the first and second nodes in a second direction opposite to the first direction, the following may be employed that a first subnetwork IP address of each of the first subnetworks is determined based on a first set comprising the predetermined number, the identification number of the first node, and a first number associated with the first subnetworks, and that a second subnetwork IP address of each of the second subnetworks is determined based on a second set comprising the predetermined number, the identification number of the first node, and a second number associated with the second subnetworks. More specifically, the sum of the predetermined number and the identification number of the first node may be assigned to a first octet of the second address of a first subnetwork IP address and the first number may be assigned to the second octet of the second address of the first subnetwork IP address, and further the sum of the predetermined number and the identification number of the first node may be assigned to the first octet of the second address of a second subnetwork IP address and the second number may be assigned to the second octet of the second address of a second subnetwork IP address.

As described above, according to the present invention, the respective unique addresses of the network elements are automatically generated based on the predetermined unique numbers of nodes and the interconnection information of the network elements within the network.

DETAILED DESCRIPTION OF THE PREFERRED EMBODIMENT

An automatic address generation method according to an embodiment of the present invention will be described hereinafter, taking a ring network including four nodes as an example in order to simplify the explanation for the embodiment. Needless to say, the present invention is applicable to a ring network having a desired number of nodes and subnetworks. Furthermore, the automatic address generation method as described later is implemented by an address generator which is formed with a computer including a central processing unit (CPU), a memory for storing necessary programs and data, a monitor display, input devices including a keyboard and a pointing device, and other necessary devices.

Figure 1:
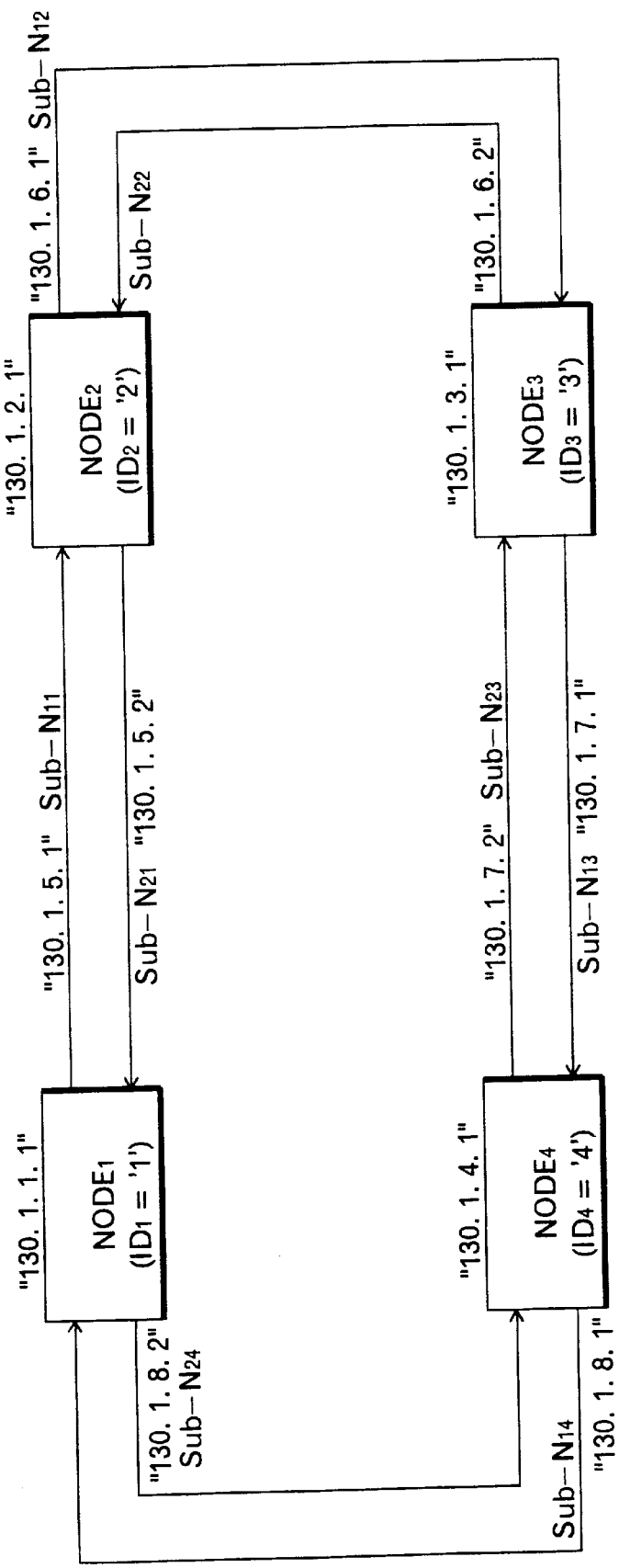
FIG. 1 is a schematic block diagram showing an example of a ring network where IP addresses are assigned to the nodes and subnetworks according to an embodiment of the present invention.

Referring to FIG. 1, it is assumed for simplicity that the ring network includes nodes $NODE_1$, to $NODE_4$ to which the identification numbers $ID_1$–$ID_4$ have been assigned, respectively. In this example, the identification numbers $ID_1$–$ID_4$ are '1', '2', '3', and '4', respectively, A subnetwork is provided on each of clockwise line $LINE_1$ and counterclockwise line $LINE_2$ between any two adjacent nodes. More specifically, the ring network includes subnetworks $SUB-N_{11}L$ to $SUB-N_{14}$ on the clockwise line $LINE_1$ and subnetworks $SUB-N_{21}$ to $SUB-N_{24}$ on the counterclockwise line $LINE_2$. A subnetwork is represented by $SUB-N_{XY}$, where X (X=1 or 2) indicates the numeral subscript of the clockwise line $LINE_1$ or the counterclockwise line $LINE_2$, and Y (Y=1, 2, 3, or 4) indicates the numeral subscript of a counterclockwise adjacent node of the subnetwork itself.

The respective IP addresses of the nodes $NODE_1$ to $NODE_4$, the subnetworks $SUB-N_{11}$ to $SUB-N_{14}$ and $SUB-N_{21}$, to $SUB-N_{24}$ are automatically generated according to a predetermined address generation rule as described hereinafter.

Figure 2:
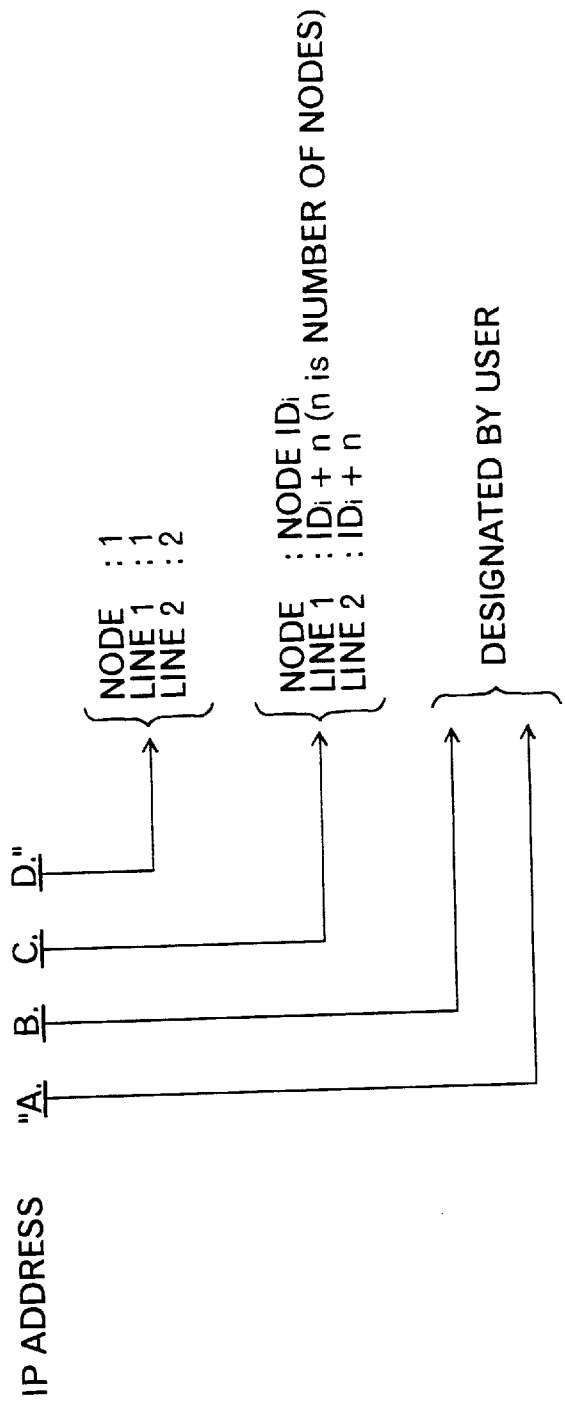
FIG. 2 is a schematic diagram showing a basic rule for determining an IP address to be assigned to a node or a subnetwork according to the embodiment.

Referring to FIG. 2, an IP address is generally represented by the formula: 'A. B. C. D', where the first two octets A and B indicate a network address (here A='130' and B='1') and the last two octets C and D indicate a host address which will be determined by the predetermined address generation rule. According to the present embodiment, when a network element in question is a node $NODE_i$, its IP address is determined such that the identification number $ID_i$ is used for the third octet C and a predetermined value of 1 is used for the last octet D. When the network element in question is a subnetwork $SUB-N_{1i}$ on the clockwise line $LINE_1$, its IP address is determined by that the sum of the identification number $ID_i$ and the number of nodes, that is, $ID_i+4$, is used for the third octet C and the predetermined value of 1 is used for the last octet D. Finally, when the network element in question is a subnetwork $SUB-N_{2i}$ on the counterclockwise line $LINE_2$, its IP address is determined such that the sum of the identification number $ID_i$ and the number (n) of nodes, that is, $ID_i+4$, is used for the third octet C and a predetermined value of 2 is used for the last octet D. In this way, a unique IP address is automatically assigned to each of the nodes and the subnetworks in the ring network. More detailed description will be provided referring to FIGS. 1 and 3.

Figure 3:
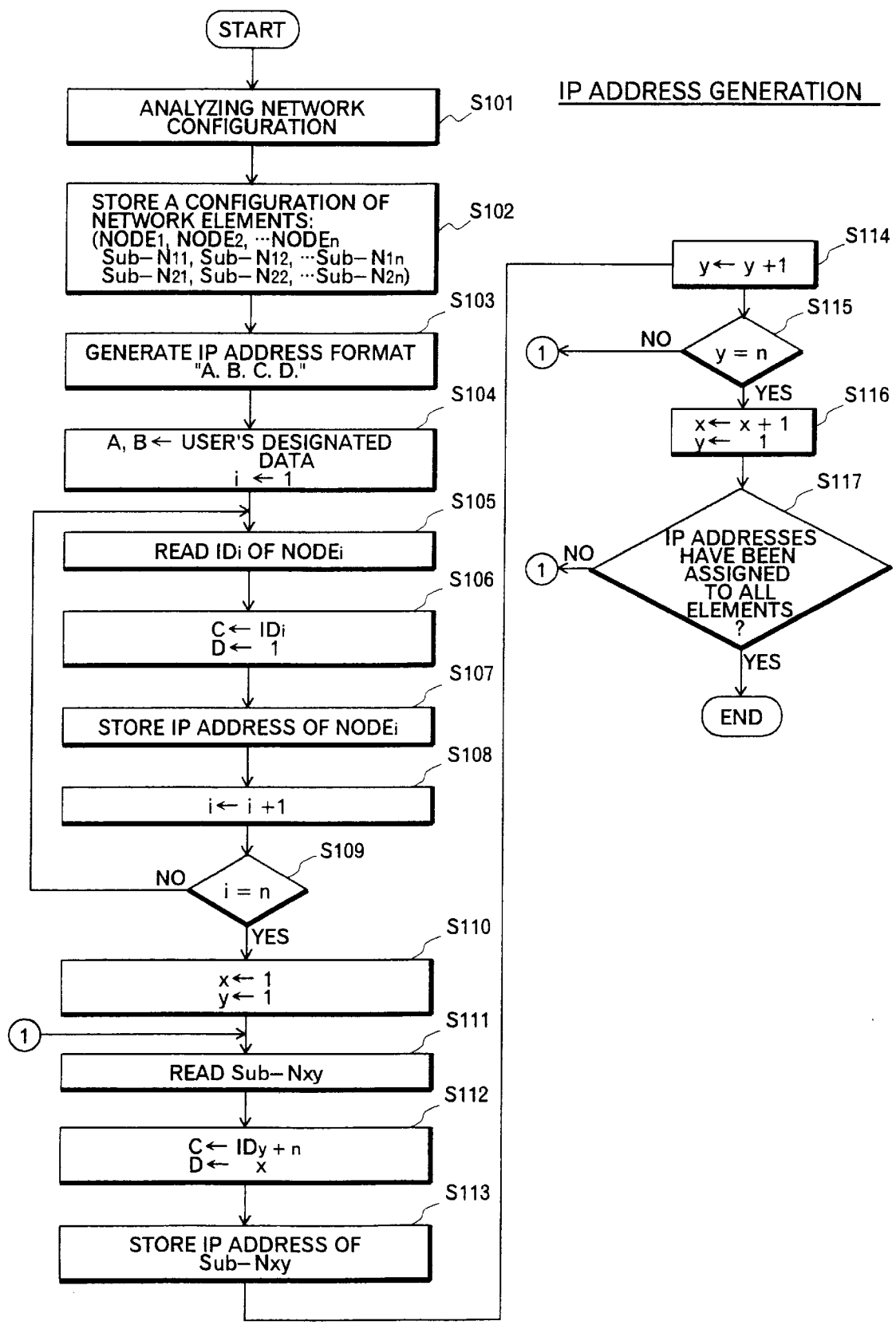
FIG. 3 is a flow chart showing an IP address assignment method according to the embodiment.

As shown in FIG. 3, the address generator analyzes the network configuration to produce configuration information including the number n of nodes, node IDs, and interconnection relationships among the nodes ($NODE_i$) and the subnetworks ($SUB-N_{XY}$) as shown in FIG. 1 (step S101), and then the configuration information is stored into a random-access memory (step S102). After an IP address format 'A. B. C. D' is generated and displayed on screen (step S103), the user designates the contents of the first two octets A and B such that A='130' and B='1' (step S104).

When the first two octets A and B have been designated, a variable i is initialized and then the identification number $ID_i$ of a node $NODE_i$ is read (step S105). Since the read network element is a node, the identification number $ID_i$ is used for the third octet C and the value of 1 is used for the last octet D (step S106). In this case, since i is equal to 1, both C and D are '1'. Therefore, the IP address of the node $NODE_1$ is determined to be '130. 1. 1. 1' as shown in FIG. 1. After the IP address '130. 1. 1. 1' is stored (step S107), the variable i is incremented (step S108) and it is checked whether the variable i reaches n (=4) (step S109). The steps S105–S109 are repeated while incrementing the variable i until the variable i reaches n. In this manner, the respective IP addresses of the nodes $NODE_1$ to $NODE_4$ are determined and stored.

When all the IP addresses of the nodes $NODE_1$ to $NODE_4$ have been determined (YES in step S109), two subscript variables X and Y are initialized (step S110), and then the subnetwork $SUB-N_{XY}$ is read (step S111). Since the read network element is a subnetwork, the sum of the identification number $ID_Y$ and the total number n of the nodes is used for the third octet C and the value of X is used for the last octet D (step S112). In this instance, since both X and Y are equal to 1, C is '5' and D is '1'. Therefore, the IP address of the subnetwork $SUB-N_{11}1$ is determined to be '130. 1. 5. 1' as shown in FIG. 1. After the IP address '130. 1. 5. 1' of the subnetwork $SUB-N_{11}$ is stored (step S113), the variable Y is incremented (step S114) and it is checked whether the variable Y reaches n (=4) (step S115). The steps S111–S115 are repeated while incrementing the variable Y until the variable Y reaches n. In this manner, the respective IP addresses of the subnetworks $SUB-N_{11}$ to $SUB-N_{1n}$ on the clockwise line $LINE_1$ are determined and stored. For example, the IP address of the subnetwork $SUB-N_{13}$ is determined to be '130. 1. 7. 1' as shown in FIG. 1.

When all the IP addresses of the subnetworks $SUB-N_{11}$ to $SUB-N_{11}L$ on the clockwise line $LINE_1$ have been determined (YES in step S115), the variable X is incremented and the variable Y is initialized (step S116) and then it is checked whether the IP address generation has been completed (step S117). If not completed, the steps S111–S115 are repeated while incrementing the variable Y until the variable Y reaches n. In this manner, the respective IP addresses of the subnetworks $SUB-N_{21}$ to $SUB-N_{2n}$ on the counterclockwise line $LINE_2$ are determined and stored. For example, the IP address of the subnetwork $SUB-N_{23}$ is determined to be '130. 1. 7. 2' as shown in FIG. 1.

What is claimed is:

1. A method for automatically determining a unique address for each of a plurality of network elements in a network comprising said plurality of network elements including a plurality of nodes each having a unique number, the method comprising the steps of:

producing configuration information of the network, the configuration information including an interconnection relationship among the network elements and further including information as to whether or not each of the network elements is a node; and determining the unique address of each of the network elements based on the unique number of a corresponding one of the plurality of nodes, wherein said corresponding one of the plurality of nodes is selected for each network element based on the configuration information.

2. The method according to claim 1, wherein:

a unique address of each of the nodes is determined based on the unique number of the node; and a unique address of each of the network elements other than the nodes is determined based on both a predetermined number and the unique number of a corresponding one of the plurality of nodes.

3. A method for automatically determining a unique address for each of a plurality of nodes and a plurality of subnetworks, respectively, in a network comprising said plurality of nodes and said plurality of subnetworks, each of the nodes having a unique number, the method comprising the steps of:

producing configuration information of the nodes and the subnetworks, the configuration information including an interconnection relationship among the nodes and the subnetworks such that each of the subnetworks connects two adjacent nodes of the plurality of nodes in a predetermined direction;

determining a unique address of each of the nodes based on the unique number of the node; and determining a unique address of each of the subnetworks based on both a predetermined number and the unique number of a corresponding one of the nodes to which the subnetwork is connected according to the interconnection relationship.

4. The method according to claim 3, wherein each of the unique addresses is automatically determined according to a predetermined address generation rule where the unique number of each node is used for the unique address of the node and both the predetermined number and the unique number of the node are used for the unique address of each of the subnetworks connected to the node according to the interconnection relationship.

5. The method according to claim 3, wherein:

the plurality of subnetworks comprises a plurality of first subnetworks and a plurality of second subnetworks;

the interconnection relationship is such that each of the first subnetworks connects a first node of the plurality of nodes and a second node of the plurality of nodes, said second node being adjacent to the first node in a first direction and each of the second subnetworks connects the first node and the second node in a direction opposite to the first direction;

a unique address of each of the first subnetworks is determined based on a first set comprising the predetermined number, the unique number of the first node, and a first number associated with the plurality of first subnetworks; and unique address of each of the second subnetworks is determined based on a second set comprising the predetermined number, the unique number of the first node, and a second number associated with the plurality of second subnetworks.

6. The method according to claim 3, wherein each unique address is an IP (Internet Protocol) address comprising a first field used for a predetermined address and a second field used for an address to be determined by said determining steps.

7. The method according to claim 6, wherein the IP address of each node is determined such that the unique number of the node is used for the address to be determined.

8. The method according to claim 6, wherein the IP address of each subnetwork is determined such that both the predetermined number and the unique number of the node are used for the address to be determined.

9. The method according to claim 5, wherein each unique address is an IP address comprising a first field used for a predetermined address and a second field used for an address to be determined by said determining steps.

10. The method according to claim 9, wherein the IP address of each node is determined such that the unique number of the node is used for the address to be determined.

11. The method according to claim 9, wherein the IP address of each of the first subnetworks is determined such that the first set is used for the address to be determined and the IP address of each of the second subnetworks is determined such that the second set is used for the address to be determined.

12. A method for automatically generating an IP address for each of a plurality of network elements provided in a network comprising a plurality of nodes each having an identification number, the method comprising the steps of:

producing configuration information of the network, the configuration information including an interconnection relationship among the network elements and further including information as to whether or not each of the network elements is a node; and generating each of the IP addresses according to a predetermined address generation rule which is defined based on the identification numbers of the nodes and the configuration information.

13. The method according to claim 12, wherein the plurality of network elements is arranged in a ring configuration.

14. The method according to claim 13, wherein each of the IP addresses comprises a first address and a second address, the first address being predetermined and the second address being determined according to the predetermined address generation rule.

15. The method according to claim 14, wherein the IP addresses include node IP addresses which are assigned to each of the nodes.

16. The method according to claim 15, wherein the identification number of each node is assigned to a first octet of the second address of the node IP address and a predetermined number is assigned to a second octet of the second address of the node IP address.

17. The method according to claim 14, wherein the IP addresses include subnetwork IP addresses which are assigned to each of a plurality of subnetworks located between two adjacent nodes of the plurality of nodes.

18. The method according to claim 17, wherein a subnetwork IP address of each of the subnetworks is determined based on both a predetermined number and the identification number of one of the plurality of nodes to which the subnetwork is connected according to the interconnection relationship.

19. The method according to claim 18, wherein:

the plurality of subnetworks comprises a plurality of first subnetworks and a plurality of second subnetworks;

the interconnection relationship is such that each of the first subnetworks connects a first node of the plurality of nodes and a second node of the plurality of nodes, said second node being adjacent to the first node in a first direction and each of the second subnetworks connects the first and second nodes in a second direction opposite to the first direction;

a first subnetwork IP address of each of the first subnetworks is determined based on a first set comprising the predetermined number, the identification number of the first node, and a first number associated with the first subnetworks; and a second subnetwork IP address of each of the second subnetworks is determined based on a second set comprising the predetermined number, the identification number of the first node, and a second number associated with the second subnetworks.

20. The method according to claim 19, wherein:

a sum of the predetermined number and the identification number of the first node is assigned to a first octet of the second address of a first subnetwork IP address and the first number is assigned to the second octet of the second address of the first subnetwork IP address; and the sum of the predetermined number and the identification number of the first node is assigned to the first octet of the second address of a second subnetwork IP address and the second number is assigned to the second octet of the second address of a second subnetwork IP address.

* * * * *